United States Patent
Camy et al.

[19]

[11] Patent Number: 5,950,904
[45] Date of Patent: Sep. 14, 1999

[54] GAS CONTAINMENT BOX USED WITH A WELDING HEAD

[75] Inventors: Florent Camy, Nandy; Gérard Louis Zanolin, Oncy Sur Ecole, both of France

[73] Assignee: Societe Nationale d'Etude et de Construction de Moteurs d'Aviation "Snecma", Paris, France

[21] Appl. No.: 08/877,557

[22] Filed: Jun. 17, 1997

[30] Foreign Application Priority Data

Jun. 27, 1996 [FR] France ................................. 96 07980

[51] Int. Cl.⁶ .............................. B23K 1/00; B23K 37/02
[52] U.S. Cl. ..................... 228/42; 228/45; 219/121.22; 219/121.24
[58] Field of Search ................. 228/42, 45, 219; 219/121.86, 121.21, 121.22, 121.24, 72, 73, 74, 75; 277/643, 644, 645

[56] References Cited

U.S. PATENT DOCUMENTS 4,103,912  8/1978  Thome ................................. 219/121.22
5,674,417 10/1997  Schaugaard et al. ............... 219/137 R

FOREIGN PATENT DOCUMENTS 2 504 042 10/1982  France .
1407 723   7/1988  U.S.S.R. .

OTHER PUBLICATIONS

Patent Abstracts of Japan, vol. 14, No. 80 (C–0689), Feb. 15, 1990, JP 01 298145, Dec. 1, 1989.

*Primary Examiner*—Patrick Ryan
*Assistant Examiner*—Kiley Stoner
*Attorney, Agent, or Firm*—Oblon, Spivak, McClelland, Maier & Neustadt, P.C.

[57] ABSTRACT

This invention concerns a containment box disposed around a welding head (1) and including a fixed frame carrying a fairing (16) modeled to the shape of the element (3) to be welded, a cover (9) sliding on the frame (10), and a bell with spherical boss (7) integral with the welding head (1) which slides and rotates in a vertical sleeve (8) traversing the cover (9). All the movements of the welding head (1) are therefore permitted which makes it possible to have complicated welding trajectories. Gaskets (15, 17) are provided.

11 Claims, 2 Drawing Sheets

GAS CONTAINMENT BOX USED WITH A WELDING HEAD

FIELD OF THE INVENTION

The invention concerns a gas containment box used with a welding head.

BACKGROUND OF THE INVENTION

Certain welding methods needed to take place in a neutral atmosphere which can be effected by containing the welding machine and the elements to be welded in a chamber or by blowing the neutral gas in a sheath surrounding the energy beam and the molten zone. The consumption of gas is significant in both cases, as the volume of the chamber or the blowing flowrate needs to be considerable. This is why in the present invention another solution has been put forward and in this case containment is obtained by a box partially integral with the welding head and traversed by the welding head. This box can be placed solely on a portion of the elements to be welded so as to cover the welding joint, although it can also fully surround these elements. The gas is therefore confined in a closed volume but with a much smaller volume than a chamber which would contain the entire machine; and although the box needs to be open so as to give passage to the welding head and possibly to cover only one portion of the elements to be welded, there is no need to blow an extremely small amount of protection gas as leaks are negligible.

SUMMARY OF THE INVENTION

Generally speaking, the invention concerns a gas containment box used with a welding head and includes a frame, a fairing lined with a first gasket resting on an element to be welded on a free circumference opposite a circumference for fixing to the frame, a cover sliding on the frame inside a plane, a second gasket disposed on a circumference of the frame and rubbing on the cover, and a bell fixed to the welding head engaged in a sleeve traversing the cover and extending perpendicular to the plane, the bell sliding and being adjusted imperviously in the sleeve. The bell is preferably adjusted in the sleeve by a spherical portion.

One main advantage of the invention is that the complex trajectories of the welding head in the three spatial dimensions are made possible and that the head can even be slanted freely within certain limits with adjustment by the spherical portion.

BRIEF DESCRIPTION OF THE DRAWINGS

The invention is now to be described in more detail with the aid of the following figures given by way of non-restrictive illustration.

Figure 1:
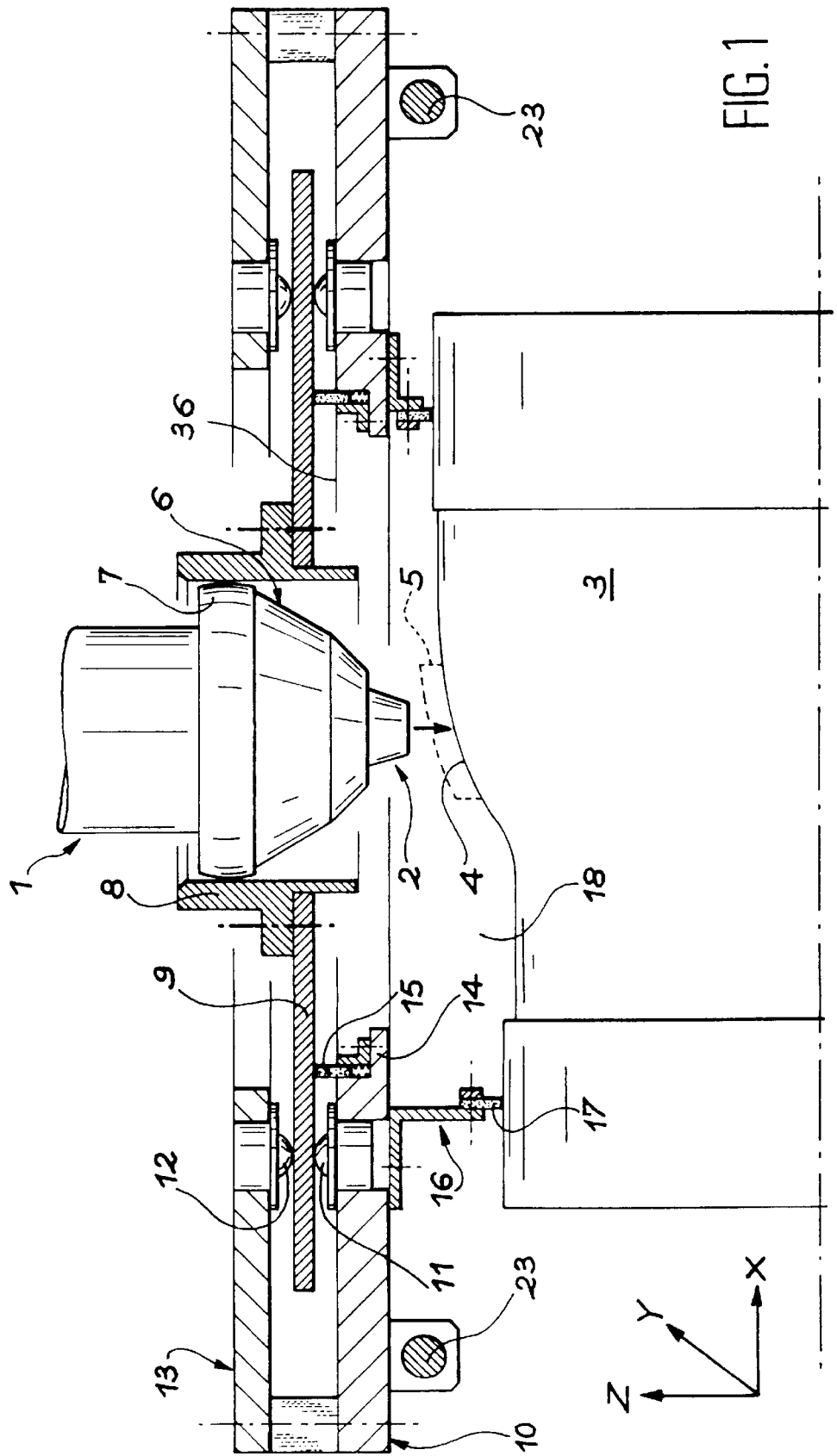
FIG. 1 is a sectional view of the invention.

With reference to firstly FIG. 1, the welding head bears the reference 1 and is ended at a nose 2 directed towards the element to be welded, in this instance a rotor wheel 3 on a median circumference 4 from which vanes 5 are to be welded, which requires that the head 1 needs to complete closed short trajectories in front of the wheel 3, these trajectories mainly extending in the horizontal directions X and Y but also in the vertical direction Z since the median circumference 4 is slanted and it is necessary to keep the nose at a constant distance from it. Finally, the orientation of the welding head 1 needs to be modified via rotation around the vane 5.

So as to ensure these various movements while maintaining a. closed volume around the vane 5, a bell 6 is provided and is integral with the welding head 1 and disposed around it slightly behind the nose 2, this bell 6 including a boss 7 with the shape of a spherical trunk which imperviously slides in a sleeve 8 irrespective of the inclination of the welding head 1.

The sleeve 8 forms part of the containment box and is described as follows. It is orientated in the vertical direction Z and extends through a circular cover 9. A frame 10 with a circular or rectangular circumference is fitted with two opposing balls 11 and 12, one being disposed on the frame 10 itself and the other under an upper shoulder 13 of the frame 10 and folded back inwardly. A frame 10 surrounds an opening 36.

The cover 9 is vertically supported between the balls 11 and 12, but it can move freely in a horizontal direction driven with the sleeve 8 by the welding head 1 within relatively wide limits since the upper shoulder 13 is much wider than it. If required, it can also rotate.

An internal edge 14 of the frame bears a sealing lip 15 whose extremity rubs on the lower face of the cover 9, thus maintaining imperviousness at this location. A fairing 16 is screwed under the frame 10 via its upper edge and is shaped so as to be adapted to approximate the shape of the wheel 3 and, as it is movable, is replaced by another when the welding machine is allocated to another work operation. The lower extremity of the fairing 16 bears another sealing lip 17 rubbing on the wheel 3. The two lips 15 and 17, the fairing 16, the frame 10, the cover 9, the sleeve 8 and the bells 6 delimit a sealed volume 18 with the wheel 3 and it merely suffices to fill with the required gas so as to create the desired atmosphere around the nose 2.

Figure 2:
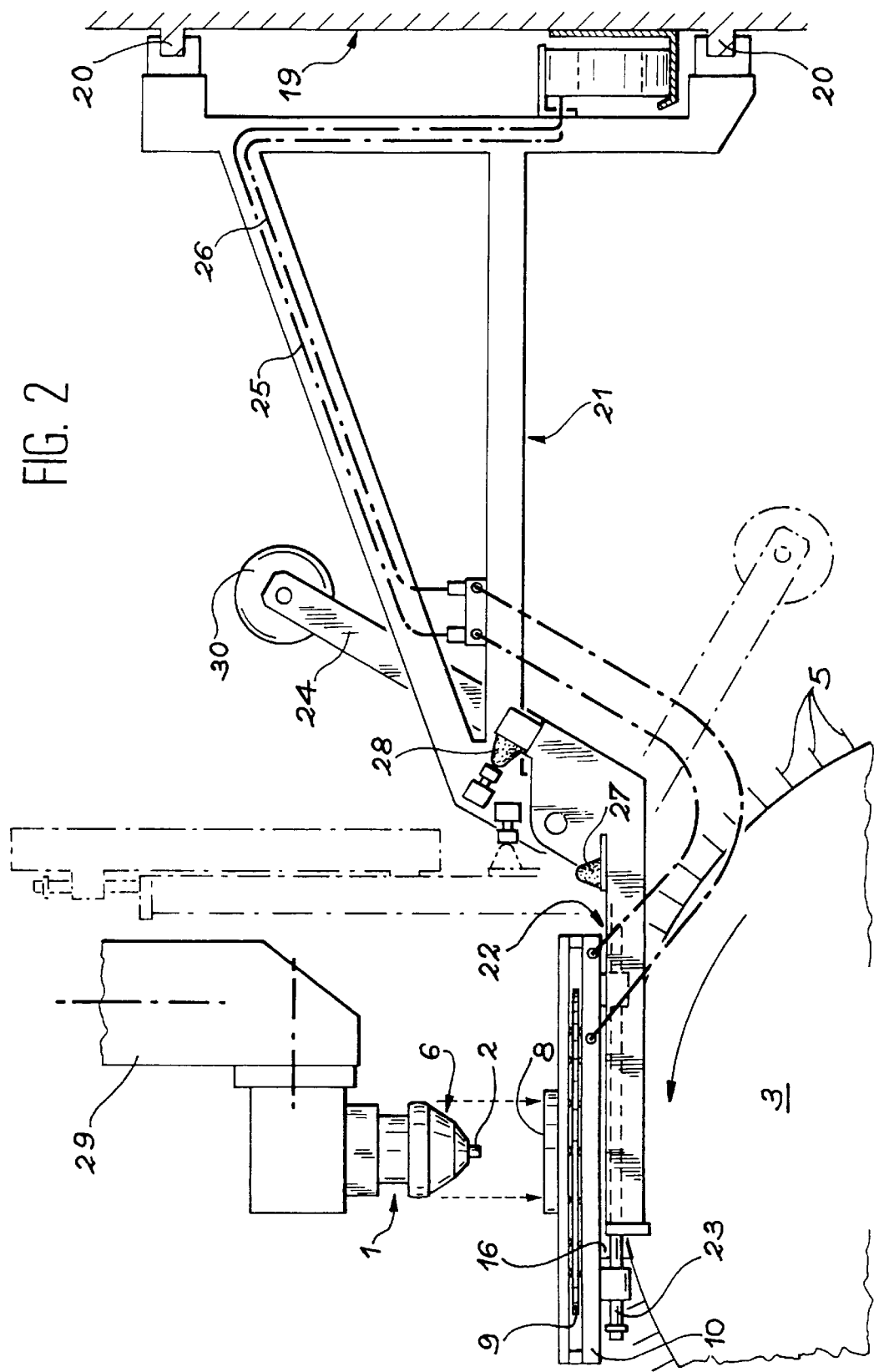
FIG. 2 is a perspective view of the box on an element to be welded, the welding robot also being partially shown.

Other details of the invention can be seen on FIG. 2, in particular the means for supporting the frame 10: two horizontal rails 20 are hooked to one wall 19 of the welding machine so as to enable a carriage 21 to move along this wall, and a tilting plate 22 is situated at the end of the carriage 20. The frame 10 slides into it by sliding on a pair of rails 23 visible on FIG. 1 and horizontal like the previous ones but perpendicular to the them so as to allow the frame to draw away of come nearer the wall 19. Finally, an arm 24 can be tilted so as to lower the plate and make the frame 10 and fairing 16 move down so as to place them on the wheel 3, or on the other hand lift said arm up so as to disengage the wheel 3 when a rotor has been welded and when it is necessary to place another there.

Two gas pipes (carrying argon and helium gases, for example) running along the carriage 21 and traversing the frame 10 to inject into it the desired composition atmosphere bear the references 25 and 26.

Two buffers 27 and 28 are fixed to the plate 22 so as to retain it in extreme rotation positions when they touch the stops of the carriage 21. Finally, the arm of the welding machine, which caries the head 1 along its trajectory, bears the reference 29. As the welding machine is of a known type, this arm is only partially shown. A counterweight 30 is attached to the arm 24 so as to adjust the pressure exerted by the lip 17 on the wheel 3.

What is claimed is:

1. A gas containment apparatus for a welding machine having a wielding head, comprising:

a frame surrounding an opening;

a cover slidably provided on the frame and extending along a plane to cover the opening;

a sleeve which contains the welding head, passes through the cover at the opening and is connected to the cover, the sleeve being sealed by a spherical portion of the welding head which is slidable inside the sleeve;

a first gasket surrounding the opening and adapted to be disposed between the frame and an element to be welded by the welding head in contact with the element; and a second gasket surrounding the opening and disposed between the frame and the cover.

2. A gas containment apparatus according to claim 1, wherein the sleeve extends perpendicular to the plane.

3. A gas containment apparatus according to claim 1, further comprising:

a carriage movably supporting the frame along the plane.

4. A gas containment apparatus according to claim 3, wherein the carriage includes a tilting plate to lift or lower the frame.

5. A gas containment apparatus according to claim 4, further comprising:

a shoulder mounted to the frame, the shoulder and the frame being fitted with balls between which the cover is retained.

6. A gas containment apparatus according to claim 4, further comprising:

a fairing surrounding the opening and disposed between the frame and the first gasket.

7. A gas containment apparatus for a welding machine having a welding head, comprising:

a frame surrounding an opening;

a cover slidably provided on the frame and extending along a plane to cover the opening;

a sleeve which contains the welding head, passes through the cover at the opening and is connected to the cover, the sleeve being sealed by the welding head which is slidable inside the sleeve;

a first gasket surrounding the opening and adapted to be disposed between the frame and an element to be welded by the welding head in contact with the element;

a second gasket surrounding the opening and disposed between the frame and the cover; and a carriage including a tilting plate to lift or lower the frame.

8. A gas containment apparatus according to claim 7, wherein the sleeve extends perpendicular to the plane.

9. A gas containment apparatus according to claim 7, further comprising:

a shoulder mounted to the frame, the shoulder and the frame being fitted with balls between which the cover is retained.

10. A gas containment apparatus according to claim 7, further comprising:

a fairing surrounding the opening and disposed between the frame and the first gasket.

11. A welding machine comprising:

a welding head having a spherical portion;

a frame surrounding an opening;

a cover slidably provided on the frame and extending along a plane to cover the opening;

a sleeve which contains the welding head, passes through the cover at the opening and is connected to the cover, the sleeve being sealed by the spherical portion of the welding head which is slidable inside the sleeve;

a first gasket surrounding the opening and adapted to be disposed between the frame and an element to be welded by the welding head in contact with the element; and a second gasket surrounding the opening and disposed between the frame and the cover.

* * * * *